United States Patent [19]

Hochel et al.

[11] Patent Number: 4,522,794

[45] Date of Patent: Jun. 11, 1985

[54] FLUORINATION PROCESS USING CATALYST

[75] Inventors: Robert C. Hochel; Kathy A. Saturday, both of Aiken, S.C.

[73] Assignee: The United States of America as represented by the Department of Energy, Washington, D.C.

[21] Appl. No.: 526,249

[22] Filed: Aug. 25, 1983

[51] Int. Cl.$^3$ ............................................. C01G 56/00
[52] U.S. Cl. ...................................... 423/251; 423/19
[58] Field of Search .................................. 423/19, 251

[56] References Cited

U.S. PATENT DOCUMENTS

| | | | |
|---|---|---|---|
| 2,892,678 | 6/1959 | Thompson et al. | 423/251 |
| 2,893,826 | 7/1959 | Malm | 423/251 |
| 3,098,709 | 7/1963 | Mecham et al. | 423/251 |
| 3,708,568 | 1/1973 | Golliher et al. | 423/19 |
| 3,825,650 | 7/1974 | Gustison et al. | 423/19 |
| 3,869,256 | 3/1975 | Ziegler | 423/251 |
| 4,172,114 | 10/1979 | Tsujino et al. | 423/251 |
| 4,202,861 | 5/1980 | Bourgeois et al. | 423/251 |

OTHER PUBLICATIONS

Yogodin et al., *Doklady Akad. Nauk SSSR*, 249, (#4), pp. 915–919, (1979).
Maeda et al., *Inorg. Nucl. Chem. Lett.*, 14, (#10), pp. 341–345, (1978).
Katz, "The Chemistry of Uranium", Part 1, pp. 396–400, McGraw-Hill, (1951), New York.
Maeda et al., *Chem. Abs.*, 91:165137s, (1979).
Yogodin et al., *Russian J. Inorg. Chem.*, 23, (#3), pp. 460–461, (1978).
Labaton, *J. Inorg. Nucl. Chem.*, 10, pp. 86–93, (1959).
Labaton et al., *J. Inorg. Nucl. Chem.*, 10, pp. 74–85, (1959).
Simons, "Fluorine Chemistry", vol. 1, pp. 66–68 and 424–431, Academic Press Inc., Publ., (1950), New York.

*Primary Examiner*—Edward A. Miller
*Attorney, Agent, or Firm*—Allen F. Westerdahl; Judson R. Hightower

[57] ABSTRACT

A process for converting an actinide compound selected from the group consisting of uranium oxides, plutonium oxides, uranium tetrafluorides, plutonium tetrafluorides and mixtures of said oxides and tetrafluorides, to the corresponding volatile actinide hexafluoride by fluorination with a stoichiometric excess of fluorine gas. The improvement involves conducting the fluorination of the plutonium compounds in the presence of a fluoride catalyst selected from the group consisting of $CoF_3$, $AgF_2$ and $NiF_2$, whereby the fluorination is significantly enhanced. The improvement also involves conducting the fluorination of one of the uranium compounds in the presence of a fluoride catalyst selected from the group consisting of $CoF_3$ and $AgF_2$, whereby the fluorination is significantly enhanced.

9 Claims, 4 Drawing Figures

FLUORINATION PROCESS USING CATALYST

BACKGROUND OF THE INVENTION

Field of the Invention and Contract Statement

The U.S. Government has rights in this invention pursuant to Contract No. De-AC09-76SR00001 between the U.S. Department of Energy and E. I. duPont deNemours & Co.

The invention relates to an improved catalytic process of the catalytic fluorination of certan actinide compounds to their volatile hexafluoride form.

DISCUSSION OF BACKGROUND AND PRIOR ART

Yogodin et al., Dold. Akad. Nauk SSR, 249, No. 4, (1979), pp. 915–919, showed that the direct fluorinations of $WO_3$, $UF_4$ and $UO_2F_2$ were greatly enhanced by additions of $NiF_2$ powder to the solid reactants. Among the findings of Yogodin et al. is that both catalyzed and uncatalyzed reactions fit the "Diminishing Sphere" model:

$$1-(1-F)^{\frac{1}{3}}=R't \qquad (1)$$

wherein F is the fraction of the completed reaction, t is time, and R' is an apparent rate constant dependent on temperature and surface area. Rates increased rapidly with catalyst addition and reached a maximum at between weight ratios, $M_o$, of 0.25 and 1.0 of catalyst to reactant, activation energies for catalyzed and uncatalyzed reactions did not change, and the catalyst decreased the $F_2$ pressure dependence from one to 0.5 to 0.7.

Similar findings were reported by Maeda and Yagi, Inorg. Nucl. Chem. Lett., 14, no. 10, (1978), pp. 341–345, studying the direct fluorination of $UO_2$ mixed with simulated fission products, but the identity of the catalyst(s) was not determined. The catalyst was disclosed to contain silver. $AgO_2$ was added as one of may constituents of the simulated fission products FP-II in Maeda and Yagi. Many other metal oxides were also added, and the mix was thoroughly fluorinated before use. It is possible that such fluorination converted the $AgO_2$ and other metal oxides into their respective fluorides—so $AgF_2$ would very probably be one of the constituents of the mix. Since many fluorides and possibly oxides were also present in the mix, which one or ones of such fluorides and/or oxides actually caused the catalysis cannot be determined from Maeda and Yagi.

SUMMARY OF THE INVENTION

An object of the invention is to provide a catalyticc process which significantly enhances the catalytic fluorination of particular actinide compounds to their volatile hexafluoride form. Other objects and advantages of the invention are set out herein or are obvious herefrom to one ordinarily skilled in the art. To achieve the foregoing and other objects and in accordance with the purpose of the invention, as embodied and broadly described herein, the invention involves an improved process of converting an actinide compound selected from the group consisting of uranium oxides, plutonium oxides, uranim tetrafluorides, plutonium tetrafluorides and mixtures of said oxides and tetrafluorides, to the corresponding volatile actinide hexafluoride by fluorination with a stoichiometric excess of fluorine gas. The improvement of the invention involves conducting the fluorination in the presence of a fluoride catalyst selected from the group consisting of $CoF_3$, $AgF_2$, $NiF_2$, and mixtures thereof, whereby the fluorination is significantly enhanced. The catalysts are solids which are non-volatile within the temperature range of the fluorination process.

A narrower embodiment of the invention involves an improved process of converting an actinide compound selected from the group consisting of $UO_2$, $UF_4$, $UO_2F_2$ and mixtures of $UO_2$ and $UF_4$, to volatile $UF_6$ by fluorination with a stoichiometric excess of $F_2$ gas. The improvement is composed of conducting the fluorination in the presence of a fluoride catalyst selected from the group consisting of $CoF_3$ and $AgF_2$, whereby the fluorination is significantly enhanced. $CoF_3$ is the preferred catalyst for the fluorination of the uranium compounds. $CoF_3$ increased the $UF_6$ formation rate by a factor of 150 to 300 at a given temperature.

Another narrower embodiment of the invention involves an improved process of converting an actinide compound selected from the group consisting of $PuO_2$, $PuF_4$ and mixtures of $PuO_2$ and $PuF_4$, to $PuF_6$ by fluorination with a stoichiometric excess of $F_2$ gas. The improvement is composed of conducting the fluorination in the presence of a fluoride catalyst selected from the group consisting of $CoF_3$, $AgF_2$ and $NiF_2$ whereby the fluorination is significantly enhanced. $NiF_2$ is the preferred catalyst for the fluorination of the plutonium compounds.

The $UF_4$ fluorination reaction can be performed at a temperature between 150° and about 650° C. Preferably the $UF_4$ fluorination reaction is performed at a temperature above 200° C. The invention work was performed at between 150° to 250° C. (commercially $UF_6$ is produced from $UF_4$ and $F_2$ at 500° to 600° C.).

The $PuF_4$ fluorination reaction can be performed at 150° to about 750° C. Preferably the $PuF_4$ fluorination reaction is performed at a temperature of 375° C. or above (as the reaction rate is not appreciable below that temperature). The invention work was performed at between 350° and 450° C., with most of it done at 400° C. (prior workers have mostly reacted $PuF_4$ and $F_2$ at 500° to 700° C.).

Any pressure of $F_2$ can be used, but preferably a subatmospheric pressure of pure $F_2$ is used. Pure $F_2$ is very hazardous under pressure. The invention work was mostly done with pure $F_2$ at 300 torr. The $F_2$ can be used in diluted form, using diluents such as Ar and $N_2$, but the fluorination rates of both $UF_4$ and $PuF_4$ increase with increasing $F_2$ pressure so the use of pure $F_2$ is preferred.

The invention broadly involves the catalysis of solid-gas fluorination reactions by certain solid metal fluorides. $CoF_3$ is far superior to $NiF_2$ for $UF_4$ fluorinations using F gas. This finding can be very significant in the $UF_6$ production industry. $CoF_3$ is an effective catalyst for all of the uranium oxides and oxyfluorides.

For plutonium fluorinations, $NiF_2$ gave larger enhancements than either $CoF_3$ or $AgF_2$. A 20 wt-percent of $NiF_2$ produced enhancements over the uncatalyzed reactions by factors of 8.1 and 3.6 for $PuO_2/PuF_4$ cake and $PuF_4$, respectively. While being much smaller than the enhancements observed for uranium, such enhancements appear to be more than adequate for the 20 to 30 percent increased sought by the industry as a way to reduce certain plant feed preparation requirements. The invention is the first to suggest and demonstrate that plutonium flourination reaction rates are actually catalyzed, as opposed to just being increased by extreme reaction conditions. Catalyzed production applications of uranium and/or plutonium compound fluorination using the invention process are practical.

The invention can be used in conjunction with a molecular laser isotope separation process for plutonium. Such separation process is based on the selective photodissociation of $PuF_6$ gas by appropriate laser frequencies to produce a solid product, $PuF_4$ and/or $PuF_5$. The product, enriched in Pu-239, is collected on porous nickel filters and subsequently recovered by refluorination to $PuF_6$. Such $PuF_6$ feed can be generated from either $PuO_2$, $PuF_4$ or a mixed oxide of 30 percent $PuO_2$/70 percent $PuF_4$ (converted cake). Fluorination of these solids to produce $PuF_6$ feed can be done in a fluidized bed. The invention process can be used to produce the feed $PuF_6$ gas and to refluorinate the product to $PuF_6$ gas. For example, if two $PuF_6$ feed preparation lines were required for such separation process using existing fluidized-bed performance data, the process of the invention could provide more than an increase of 20 to 30 percent in the $PuF_6$ production rates, which reduce from two to one the number of feed preparation lines.

Reference will now be made in detail to the present preferred embodiments of the invention, examples of which are illustrated in the accompanying drawing.

BRIEF DESCRIPTION OF THE DRAWINGS

The accompanying drawings, which are incorporated in and form a part of the specification, illustrate the invention and, together with the description, serve to explain the principles of the invention. In the drawings.

DETAILED DESCRIPTION OF THE INVENTION

All parts, percentages, ratios and proportions are on a weight basis unless otherwise stated herein or obvious herefrom to one ordinarily skilled in the art.

Figure 1:
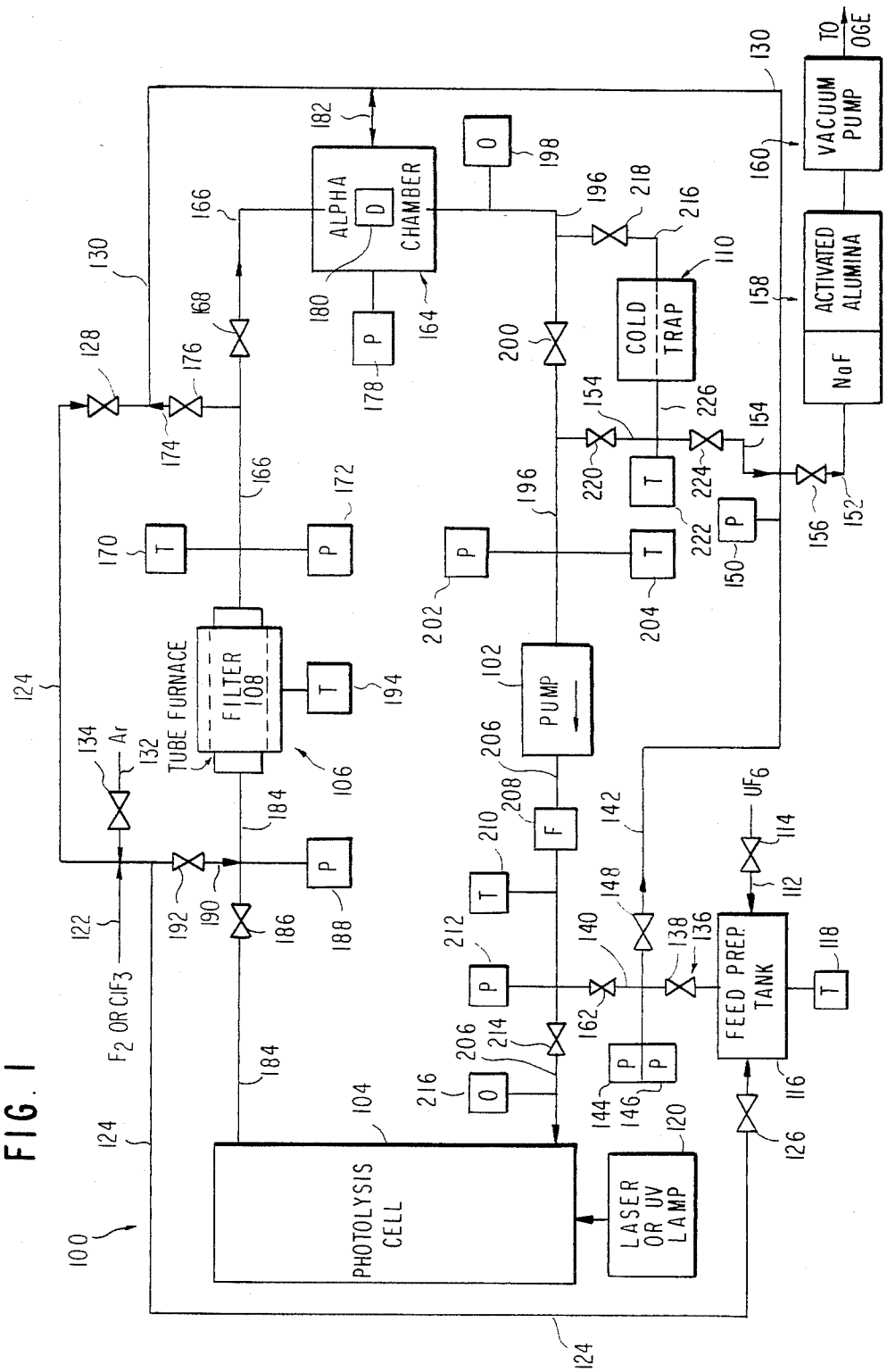
FIG. 1 is a schematic of the recirculating test loop used in the examples.

Referring to FIG. 1, an experimental test loop is disclosed for conducting solid-to-gas fluorination studies and measuring their reaction rates. Major loop components are gas circulating pump 102, photolysis cell 104, furnace tube 106 containing a filter 108 or a reaction boat, and cold trap 110 for freezing out condensables from the circulating gas stream. Included in test loop 100 are transducers and instrumentation to measure pressure, temperature, flow, optical transmittance, and gross alpha count rate. In the experiments set out below, test loop 100 was operated first in a hood for uranium studies, and later in a glove box for plutonium studies. The uranium experiments were done first so that test loop 100 and methodologies of conducting experiments could be evaluated without the constraints of a glove box.

In test loop 100, $UF_6$ is fed via line 112 having valve 114 into feed preparation tank 116 having temperature transducer 118. Laser or UV lamp 120 is associated with photolysis cell 104. $F_2$ or $ClF_3$ is fed via line 122 into line 124. On one end line 124 has valve 126 and is connected to feed preparation tank 116. The other end of line 124 has valve 128 and is connected to line 130. Ar is fed via line 132 having valve 134 into line 124 at the region therein where line 122 is located. Line 136 having valve 138 connected on one end to feed preparation tank 116 and on the other end in a tee-connection with line 140 and line 142. Pressure transducers 144 and 146 are located at the tee-connection. Line 142 has valve 148 and pressure transducers 150. The other end of line 142 is connected in a cross-connection with line 130, line 152 and line 154. Line 152 having valve 156 is connected to chamber 158 which has a NaF subchamber and an activated alumina subchamber. Vacuum pump 160 is connected to chamber 158 and exits to an off-gas exhaust system (not shown). Line 140 has valve 162. Tube furnace 160 is connected to alpha chamber 164 via line 166. Line 166 has valve 168, temperature transducer 170 and pressure transducer 172. One end of line 174 having valve 176 is connected in a tee-connection with lines 124 and 130. Alpha chamber 164 has pressure transducer 178 and alpha detector 180. Alpha chamber 164 is connected with line 130 via line 182. Line 184 having valve 186 and pressure transducer 188 connects photolysis cell 104 with tube furnace 106. Line 190 having valve 192 connects line 124 and line 184. Tube furnace 106 has temperature transducer 194. Alpha chamber 164 is connected with pump 102 via line 196. Line 196 has optical measurement point 198, valve 200, pressure transducer 202 and temperature transducer 204. Pump 102 is connected with photolysis cell 104 via line 206. Line 206 has flow transducer 208, temperature transducer 210, pressure transducer 212, valve 214 and optical measurement point 216. One end of line 140 is connected to line 206. Cold trap 110 is connected on one end to line 196 via line 216. Line 216 has valve 218. One end of line 154 is connected to line 196. Line 154 has valve 220, temperature transducer 222 and valve 224. Cold trap 110 is connected to line 154 via line 226. In FIG. 1, which the recirculating test loop, the flow patterns are indicated by arrows and arrowheads.

In FIG. 1, $\boxed{T}$ is a temperature transducer, $\boxed{P}$ is a pressure transducer, $\boxed{D}$ is an alpha transducer and $\boxed{O}$ optical measurement point.

The intent of the experiments was not to examine all the factors affecting rates, but rather to evaluate potential catalysts under a fixed set of conditions. The prior art teaches that increases in temperature, $F_2$ pressure and surface area of solid reactant and catalyst, all increase the reaction rate in a predictable manner. However, unknown and unpredictable from the prior art are which catalysts yield the highest rates and in what amounts (or levels), and what concentrations of catalysts are optimum.

Comparisons were made in the experiments by measuring the rate of a basis reaction versus the same reaction with catalysts added. A basis reaction was an arbitrary selection of fixed temperature and pressure to give an easily measurable rate for a given reaction. Other variables, such as flow, surface area and geometry, were all constants governed by the reactants, the apparatus and the measurement method.

EXAMPLE 1

A series of experiments involving $UF_4$ were conducted and involved the basis reaction:

$UF_4 + F_2 \rightarrow UF_6$

The test loop (100) of FIG. 1 was used in this example.

The $UF_4 + F_2$ basis reaction was run at 250° C. with 300 torr of pure $F_2$. Reagent grade $UF_4$ was ground in a mortar and pestal to remove lumps and give a homogeneous powder. About 60 mg of the $UF_4$ was weighed and spread into a nickel reaction boat to give a sample layer of about 2 to 3 cm². Complete reaction of the $UF_4$ to $UF_6$ required only about 3 percent of the $F_2$ gas in loop 100 so the $F_2$ gas pressure was nearly constant. The sample was placed in furnace tube 106 of loop 100, and then dried and degassed under vacuum at the desired reaction temperature until a constant pressure (about 50 microns) was reached. Loop 100 was then filled with 300 torr of $F_2$ and circulating pump 102 was turned on. The $F_2$ flow was about 500 standard cubic centimeters/minute.

The $UF_6$ was constantly measured over the time of the reaction by optical absorption cell 198 operated at a filtered 354 nm wavelength from a small mercury lamp. Optical monitor 198 was located just downstream of alpha chamber 164 of loop 100. Alpha chamber 164 which was not used in these experiments because of the low specific activity of uranium. As the equilibrium of the reaction is completely to the right and $UF_6$ is thermally stable, the $UF_6$ continuously increased up to the point where all of the $UF_4$ had been converted to $UF_6$.

The data of $UF_6$ versus time was used to calculate the fraction of the reaction which was complete at any particular time. A plot of the left-hand side of Equation 1 above generally yielded a straight line of slope R', the apparent rate constant of the reaction. The variation in R' for replicate runs was usually within ±10 to 15 percent, so that changes in rates of 20 to 30 percent or more could be easily measured.

Figure 2:
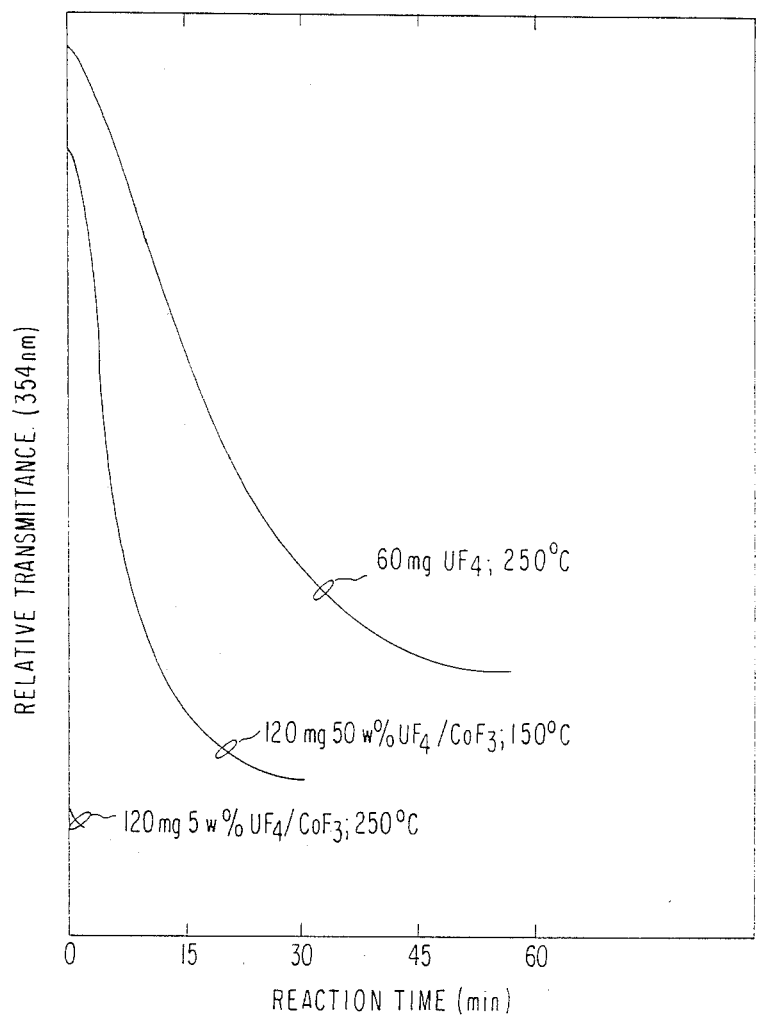
FIG. 2 is a graph of a series of plots of $UF_6$ produced versus the time of reaction.

FIG. 2 shows the optical monitor versus time tracings for three different reactions of $UF_4 + F_2 \rightarrow UF_6$. The top curve in FIG. 2 is for the basis reaction at 250° C. and shows that 60 mg of $UF_4$ can be reacted in about one hour under the indicated conditions. The bottom curve in FIG. 2 shows the data for the reaction with 60 mg of $CoF_3$ mixed with 60 mg of $UF_4$. Such reaction is nearly instantaneous when compared to the basis reaction, and was too fast to be measured with the instrumentation of loop 100. In order to obtain a measurable rate, the reaction temperature was lowered from 250° C. to 150° C., resulting in the middle curve in FIG. 2. Although $CoF_3$ will react with $UF_4$ in the absence of $F_2$, the rate is very slow. Thus, in the presence of $F_2$, $CoF_3$ is a catalyst which enormously increased the rate of $UF_4 \rightarrow UF_6$ fluorination.

According to the prior art the activation energy of these solid-to-gas fluorination reactions is apparently not changed by the addition of catalysts. Thus, the Arrhenius equation can be used to compare catalyzed and uncatalyzed rate constants at different temperature. In this way the calculated rate constant for the $CoF_3$-catalyzed reaction at 250° C. (based on measured rates at 150° C.) is about 300 times larger than the measured uncatalyzed reaction at 250° C.

Table 1 summarizes the bulk of $UF_4$ fluorination reactions studied in these experiments:

TABLE 1

$UF_6$ Fluorination Rate Constants and Enhancement Factors for Several Catalysts on $UF_4$

| Conditions* | Rate Constant Min.$^{-1} \times 10^{3}$** | Enhancement Factor |
|---|---|---|
| $UF_4$ only; 250° C. | 11 | 1 |
| $NiF_2/UF_4$ $M_o = 1.0$; 250° C. | 46 | 42 |
| $CoF_3/UF_4$ $M_o = 1.0$; 250° C. | 3150 (calculated) | 286 |
| $UF_4$ only; 150° C. | 0.15 (calculated) | 1 |
| $NiF_2/UF_4$ $M_o = 1.0$; 150° C. | ~3.8 | 25 |
| $CoF_2/UF_4$ $M_o = 1.0$; 150° C. | ~40 | 270 |
| $AgF_2/UF_4$ $M_o = 1.0$; 150° C. | ~40 | 270 |
| $CoF_3/UF_4$ $M_o = 1.0$; 150° C. | ~40 | 200 |
| $CoF_3/UF_4$ $M_o = 0.3$; 150° C. | ~40 | 100 |

Notes:
*~60 mg $UF_4$
**Conditions - 300 torr pure $F_2$; 2-3 cm² reactant surface area.

In Table 1, rate constants, which were either too fast or too slow to be measured experimentally, were calculated from the Arrhenius equation as mentioned above. Of the reactions at 250° C., only uncatalyzed $UF_4$ and $NiF_2$-catalyzed $UF_4$ gave rates which could be directly measured. $NiF_2$, the only previously reported catalyst for $UF_4$, gave an enhancement factor of about 4 based on the experiments. However, the $CoF_3$ rate, while not directly measured, was clearly far superior as its rate at 150° C. is comparable to that of $NiF_2$ at 250° C. The measured rate constants at 150° C. were only approximate because at this temperature non-stoichiometric fluorides are sometimes formed which react considerably slower than $UF_4$. For instance, three rates for $CoF_3$ at $M_o = 1$ were measured as 2.5, 2.6, and $4.2 \times 10^{-2}$ min.$^{-1}$, which are in reasonable agreement for the precision of the apparatus used. However, a fourth rate measurement (not included in Table 1) gave a value at least a factor of ten times slower. Similar discrepancies were noted in several other 150° C. measurements, and hence all Table 1 rate constants at 150° C. should be regarded as only approximate as it was impossible to discern whether the rates were truly indicative of $UF_4$ only, or of some admixture of non-stoichiometric fluorides.

In any event, $NiF_2$ clearly appears to be the poorest of the catalysts tested at 150° C. Only several runs were made with $AgF_2$ and $CoF_2$ catalysts as they appeared to offer little significant enhancement over $CoF_3$. $AgF_2$ is more costly than $CoF_3$. $CoF_2$ was converted to $CoF_3$ at both 150° C. and 250° C. and thus is not truly a catalyst.

Evaluation of the effect of the amount of catalyst could not be accurately determined in these experiments as the measured rate constants at 150° C. were only approximate. However, prior art concerning similar catalyzed reactions indicated that large enhancements persist even at low catalyst concentrations of 10 wt-percent or less. In these experiments significant catalysis was still seen at 30 wt-percent ($M_o = 0.3$) for $CoF_3$.

Figure 3:
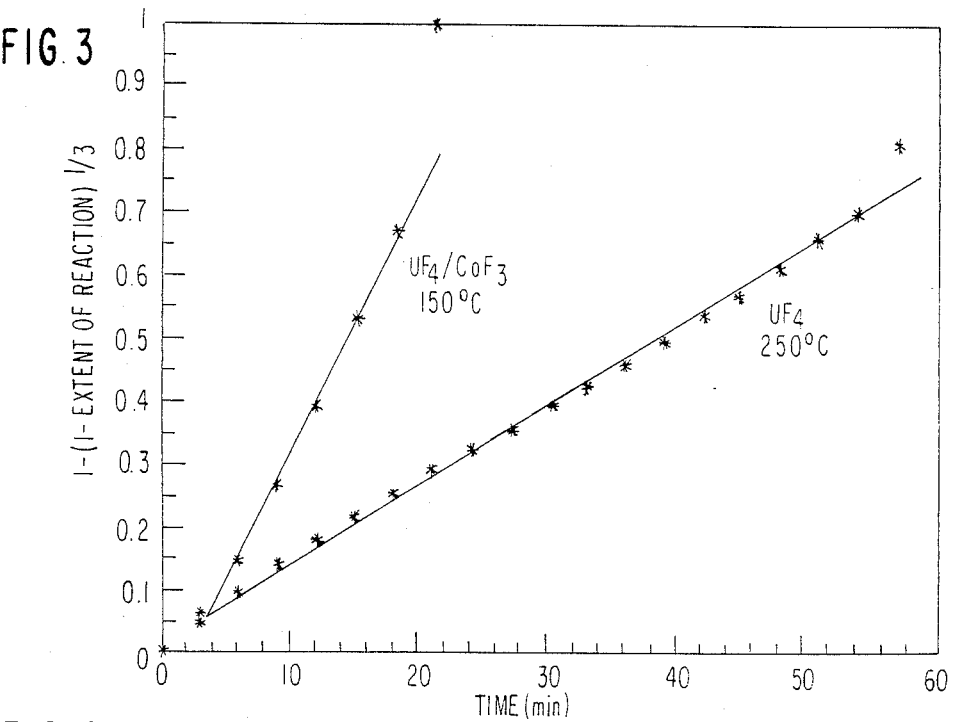
FIG. 3 is a graph of the data fit of the diminishing sphere model.

FIG. 3 illustrates the success of the diminishing sphere model in fitting both $CoF_3$-catalyzed and uncatalyzed rate data.

Table 2 shows the precision of rate data measurements obtained from the apparatus and technique used:

TABLE 2

Basis Reaction Rates
$UF_4 + F_2 \rightarrow UF_6$ at 300 Torr; 250° C.

| Run No. | Rate × 10³ Min.$^{-1}$ |
|---|---|
| 1 | 10.8 |

TABLE 2-continued

Basis Reaction Rates
$UF_4 + F_2 \rightarrow UF_6$ at 300 Torr; 250° C.

| Run No. | Rate × $10^3$ Min.$^{-1}$ |
|---------|---------------------------|
| 2       | 9.59                      |
| 3       | 14.0                      |
| 4       | 9.82                      |
| 5       | 12.2                      |
| 6       | 12.0                      |
| 7       | 10.3                      |
| 8       | 10.1                      |
| Average | 11.1 ± 1.5                |

EXAMPLE 2

A series of experiments involving a mixture of $PuO_2$ and $PuF_4$ were conducted and involved the basis reaction:

$$PuO_2/PuF_4 + F_2 \rightarrow PuF_6$$

The test loop (100) of FIG. 1 was used in this example.

The rate measurement technique developed in the above uranium had to be changed for these plutonium experiments. Because of the completeness of the $UF_4+F_2$ reaction, rates could be measured in an "integral" mode where the $UF_6$ increased and was monitored over the entire course of the reaction. The equilibrium for the $PuF_4+F_2$ reaction, however, is far to the left. Also, $PuF_6$ is thermally unstable and must be "cold-trapped" from the flowing gas stream before it decomposes if the reaction is to be driven to the right and hence completion. This is referred to as a "differential" mode experiment. The $PuF_6$ varies both up and down and can only be measured instantaneously. Such data does not lend itself to easy rate analysis and is also limited by the sensitivity of a direct $PuF_6$ monitor. This problem was overcome by monitoring pressure versus time which, of course, continually decreases as long as $PuF_6$ is produced and then removed. Temperature, however, had to be carefully controlled as it not only affected rate, but also pressure.

To do this, the apparatus (with the sample previously loaded, dried, and degassed) was filled with $F_2$ at ambient temperature and slowly heated while flowing to the desired rate-measurement temperature. Furnace 106 was regulated by a proportional controller so that the approach to the set temperature was slow and did not overshoot. During this part of the experiment, the cold trap was not cooled, so the amount of $PuF_6$ produced rose as in an integral mode run. The $PuF_6$ was measured by both optical monitor 198 and alpha monitor 180. When the $PuF_6$ reached its maximum steady-state value (approximate equilibrium), cold trap 110 was chilled with a dry ice/Freon 113 (E. I. du Pont de Nemours & Co.) bath. This changed the run to a differential mode, and the pressure decrease was monitored by a transducer (see 188 in FIG. 1) immediately upstream of the furnace tube. The pressure change was small (about 5 to 10 torr in a total of 300 torr), so the transducer output was nulled to about +100 mV to produce an easily measurable change (about 10 mV/torr). The steady-state $PuF_6$ present in loop 100 was frozen out after about a minute by cold trap 110. Such initial pressure drop (1.5 to 2 torr) at the start of the differential run was excluded from the subsequent model-fit of the pressure versus time data.

Figure 4:
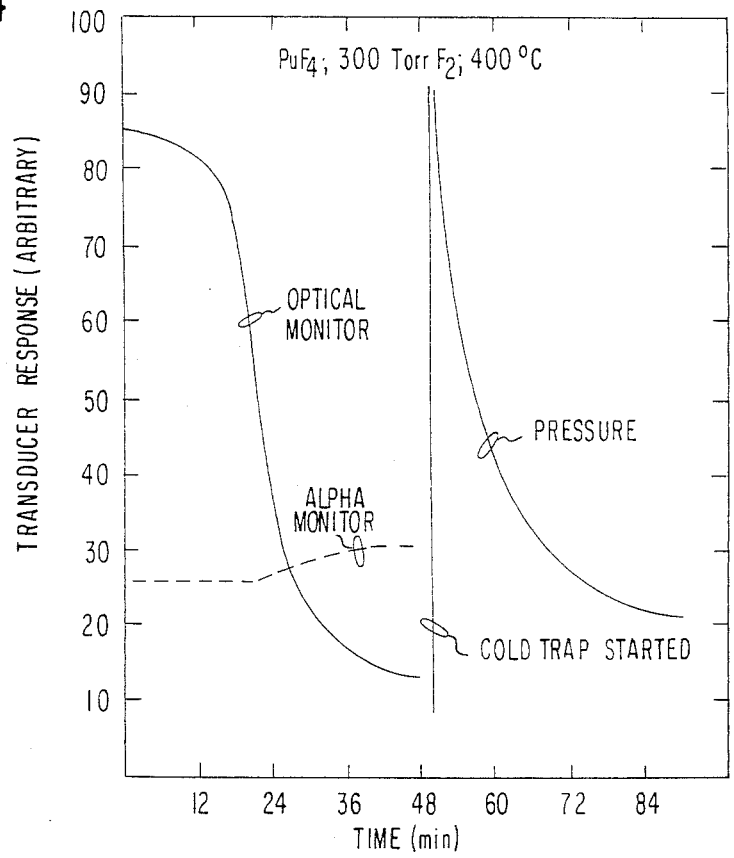
FIG. 4 is a graph of typical data from a $PuF_4$ fluorination reactions.

The pressure transducer output signal was interfaced to a computer (HP-9845 B) which was programmed to store the data, fit it to the diminishing sphere model, calculate a rate constant, and produce plots of the raw and reduced data. Data from a typical run is shown in FIG. 4; the change from an integral to a differential run took place at about 50 minutes into the run when the cold trapping was started. The run was complete about 40 minutes later when the pressure stopped decreasing.

The invention process can use a feed of $PuO_2$, $PuF_4$ or a mixture of both. The experiments were begun using converted cake. Converted cake is a mixture of 30 percent $PuO_2$ and 70 percent $PuF_4$. A number of the other experiments were run with pure $PuF_4$ made by fluorinating cake at 275° C. for six hours. Scouting experiments had shown that no $PuF_6$ was produced below 350° C. At 400° C., 50 to 60 mg quantities of cake could be converted to $PuF_6$ under 300 torr of $F_2$ in about one hour; and so such conditions were adopted as the conditions for comparative rate measurements.

The approach to these experiments was similar to that used in the uranium experiments of Example 1. Basis reaction rates were first measured and established, and then potential catalysts were added to check for enhancements over the basis reaction rates under otherwise identical conditions. Uranium studies had shown that $CoF_3$, $AgF_2$, and $NiF_2$ all produced catalysis; so all three catalysts were successfully tried on converted cake.

The use of $AgF_2$ was quickly discontinued because it is hygroscopic, making weights uncertain, and it smeared on the reaction boat surfaces, making removal difficult. Subsequently, only $CoF_3$ and $NiF_2$ were used in $PuF_4$ runs. While catalysts were reusable, they were generally discarded after each run to ensure duplication of initial conditions in later runs. A summary of the results for the cake and $PuF_4$ experiments are presented in Table 3;

TABLE 3

$PuF_6$ Fluorination Rate Constants and Enhancement Factors for Several Catalysts on Cake and $PuF_4$

| Conditions* | Rate Constant Min.$^{-1}$ × $10^3$** | Enhancement Factor |
|-------------|--------------------------------------|--------------------|
| Cake only   | 5.8                                  | 1                  |
| $NiF_2$/Cake $M_o = 0.2$ | 47                     | 8.1                |
| $AgF_2$/Cake $M_o = 0.2$ | 30                     | 5.2                |
| $CoF_3$/Cake $M_o = 0.1$ | 8.2                    | 1.4                |
| $PuF_4$ only | 25                                  | 1                  |
| $NiF_2/PuF_4$ $M_o = 0.1$ | 50                    | 2                  |
| $NiF_2/PuF_4$ $M_o = 0.2$ | 89                    | 3.6                |
| $NiF_2/PuF_4$ $M_o = 0.3$ | 46                    | 1.8                |
| $CoF_3/PuF_4$ $M_o = 0.1$ | 32                    | 1.3                |
| $CoF_3/PuF_4$ $M_o = 0.3$ | 27                    | 1.1                |

Notes:
*~60 mg cake of $PuF_4$
**Conditions - 400° C.; 300 torr pure $F_2$; 2-3 cm$^2$ reactant surface area.

As with uranium, the reaction rates for plutonium were generally reproducible to within ±15 percent.

From Table 3 it is seen that the rate constant of cake only is a factor of 4.3 slower than the constant rate for $PuF_4$ only. This is due to oxide in the cake and is in agreement with prior art reports of a slower fluorination rate of $PuO_2$ versus $PuF_4$. This is not surprising, as it is known that the $PuO_2$ is first converted to $puF_4$, which then reacts to form $PuF_6$. Furthermore, as $PuF_4$ forms on the oxide surface, the oxide core is somewhat shielded, and must wait for $F_2$ to diffuse through the $PuF_4$ or for the $PuF_4$ to react to $PuF_6$.

All three catalysts in Table 3 showed enhancement factors greater than 1 and the factors were larger for cake than for $PuF_4$. This suggests that the catalysts have a greater effect on $PuO_2$ than on $PuF_4$. A similar situation appears to be true for uranium. The enhancement for $UO_2$ by $AgF_2$ is about a factor of two greater than for $UF_4$ and is comparable to the difference observed for $PuO_2/PuF_4$ versus $PuF_4$.

Similarity appears to end there, however, as Table 3 shows three contrasting differences to the uranium data of Table 1, namely: (1) Pu enhancements are much smaller; (2) Pu enhancements appear to peak and then decrease with increasing weights of catalysts; and (3) Pu enhancements are greater for $NiF_2$ than for $CoF_3$. A possible but untested explanation for these differences may lie in the ramifications of thermal decomposition of $PuF_6$. It is possible to have a large catalytic effect without realizing a significant net rate increase or enhancement factor. Because the net rate measured is actually a difference between the forward and reverse rates, the reverse rate must be decreased compared to the forward rate if a net increase is to be observed. Since the catalyst presumably increases both the forward and reverse rate constants equally, the reverse rate, which is proportional to the $PuF_6$, can only be reduced by more rapid removal of product. Unfortunately the reverse rate (thermal decomposition) also depends on the surface area of solids in contact with the $PuF_6$ and the surface area dependence may dominate the reverse catalytic rate. If so, removal of product may not suppress the reverse catalytic rate sufficiently to give a significant net forward rate, resulting in a low enhancement factor. This reasoning also explains the peaking of the enhancement factors at fairly low catalyst concentrations because adding more catalyst increases surface area. Similarly the very large catalytic effects of $CoF_3$ and $AgF_2$ observed with uranium may be self-defeating with plutonium.

By way of summary, the process of the invention relies on the discovery that the catalytic effect of certain metal fluorides, namely, $CoF_3$, $AgF_2$, and $NiF_2$, significantly enhances the fluorination of certain actinide compounds to their volatile hexafluoride form. The invention process is of significant use in $UF_6$ production and $PuF_6$ production processes.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. In the process of converting an actinide compound selected from the group consisting of a plutonium oxide, a plutonium tetrafluoride, and a mixture of said plutonium oxides and tetrafluorides, to the corresponsing volatile actinide hexafluoride by fluorination with a stoichiometric excess of fluorine gas, the improvement which comprises conducting said fluorination in the presence of a fluoride catalyst powder selected from the group consisting of $CoF_3$, $AgF_2$ and $NiF_2$, whereby said fluorination is significantly enhanced.

2. Process as claimed in claim 1 wherein the fluoride catalyst is $CoF_3$.

3. Process as claimed in claim 1 wherein the fluoride catalyst is $AgF_2$.

4. Process as claimed in claim 1 wherein the fluoride catalyst is $NiF_2$.

5. Process as claimed in claim 1 wherein said fluorination in conducted in a fluidized bed.

6. In the process of converting an actinide compounds selected from the group consisting of $PuO_2$, $PuF_4$ and a mixture of $PuO_2$, and $PuF_4$, to volatile $PuF_6$ by fluorination with a stoichiometric excess of $F_2$ gas, the improvement which comprises conducting said fluorination in the presence of a fluoride catalyst powder selected from the group consisting of $CoF_3$, $AgF_2$ and $NiF_2$, whereby said fluorination is significantly enhanced.

7. Process as claimed in claim 6 wherein the fluoride catalyst is $CoF_3$.

8. Process as claimed in claim 6 wherein the fluoride catalyst is $AgF_2$.

9. Process as claimed in claim 6 wherein the fluoride catalyst is $NiF_2$.

* * * * *